US009429197B2

(12) United States Patent
Choi et al.

(10) Patent No.: US 9,429,197 B2
(45) Date of Patent: Aug. 30, 2016

(54) FOOD PROCESSOR

(75) Inventors: Mei Chee June Choi, Kowloon (HK); He Dong, Kowloon (HK)

(73) Assignee: Main Power Electrical Factory, Ltd., Kowloon (HK)

( * ) Notice: Subject to any disclaimer, the term of this patent is extended or adjusted under 35 U.S.C. 154(b) by 287 days.

(21) Appl. No.: 13/404,818

(22) Filed: Feb. 24, 2012

(65) Prior Publication Data

US 2013/0220764 A1    Aug. 29, 2013

(51) Int. Cl.
*A47J 43/08*    (2006.01)
*F16D 11/10*    (2006.01)
*A47J 43/07*    (2006.01)

(52) U.S. Cl.
CPC ............ *F16D 11/10* (2013.01); *A47J 43/0766* (2013.01); *A47J 43/0777* (2013.01); *A47J 43/085* (2013.01)

(58) Field of Classification Search
CPC .... A47J 43/046; A47J 43/255; A47J 43/085; A47J 43/0777; A47J 43/0766; F25C 5/12; B02C 17/22; B02C 2018/168; B02C 13/09; F16D 11/10
USPC .......... 241/37.5, 91, 92, 278.1, 282.1, 282.2
See application file for complete search history.

(56) References Cited

U.S. PATENT DOCUMENTS

| 4,216,917 | A | * | 8/1980 | Clare et al. ................ 241/37.5 |
| 4,371,118 | A | * | 2/1983 | Sontheimer et al. .......... 241/30 |
| 4,373,677 | A | * | 2/1983 | Kunihiro ................... 241/37.5 |
| 4,634,061 | A | * | 1/1987 | Williams ................ 241/101.01 |
| 6,375,102 | B1 | * | 4/2002 | Bouleau et al. ............. 241/37.5 |
| 6,474,578 | B1 | * | 11/2002 | Gonneaud et al. .......... 241/37.5 |
| 6,907,819 | B2 | * | 6/2005 | Kernan ......................... 99/492 |
| 7,028,930 | B2 | * | 4/2006 | Carnevale ................... 241/37.5 |
| 8,827,194 | B2 | * | 9/2014 | Domanico et al. .......... 241/37.5 |
| 2006/0214039 | A1 | * | 9/2006 | Domanico ..................... 241/99 |
| 2010/0206701 | A1 | * | 8/2010 | Ferraby et al. .............. 200/50.1 |
| 2011/0070815 | A1 | * | 3/2011 | Spillner et al. ............... 452/141 |

FOREIGN PATENT DOCUMENTS

KR    20070066720    *    6/2007    ............. A47J 43/04

* cited by examiner

*Primary Examiner* — Faye Francis
*Assistant Examiner* — Onekki Jolly
(74) *Attorney, Agent, or Firm* — Wells St. John P.S.

(57) ABSTRACT

A food processor or a chopper has a rotating blade, a motor, an intermediate shaft driven by the motor and an output shaft driving the blade. A first clutch member is coupled with the intermediate shaft, and a second clutch member is coupled with the output shaft. The clutch members are movable from an engaged position for driving the output shaft from the motor and a disengaged position for disengaging the output shaft from the motor. A safety interlock mechanism enables and disables the motor. A clutch lever is operable with the safety interlock to move the clutch members between the engaged and disengaged positions such that when the motor is enabled the clutch members are engaged for driving the output shaft from the motor and when the motor is disabled the clutch members are disengaged for disengaging the output shaft from the motor.

11 Claims, 4 Drawing Sheets

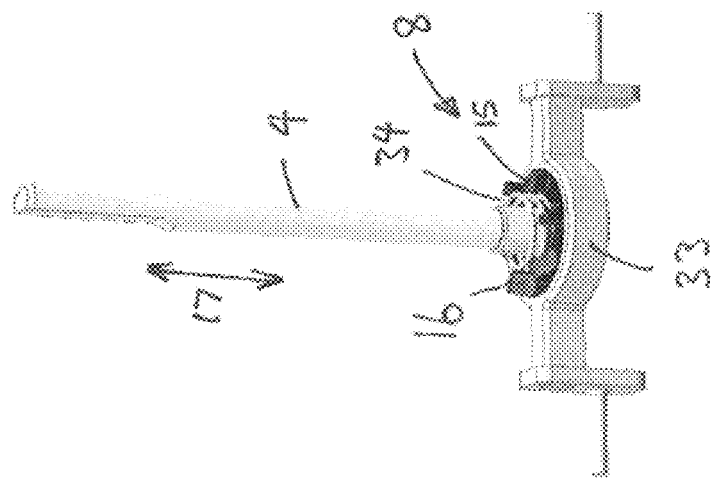
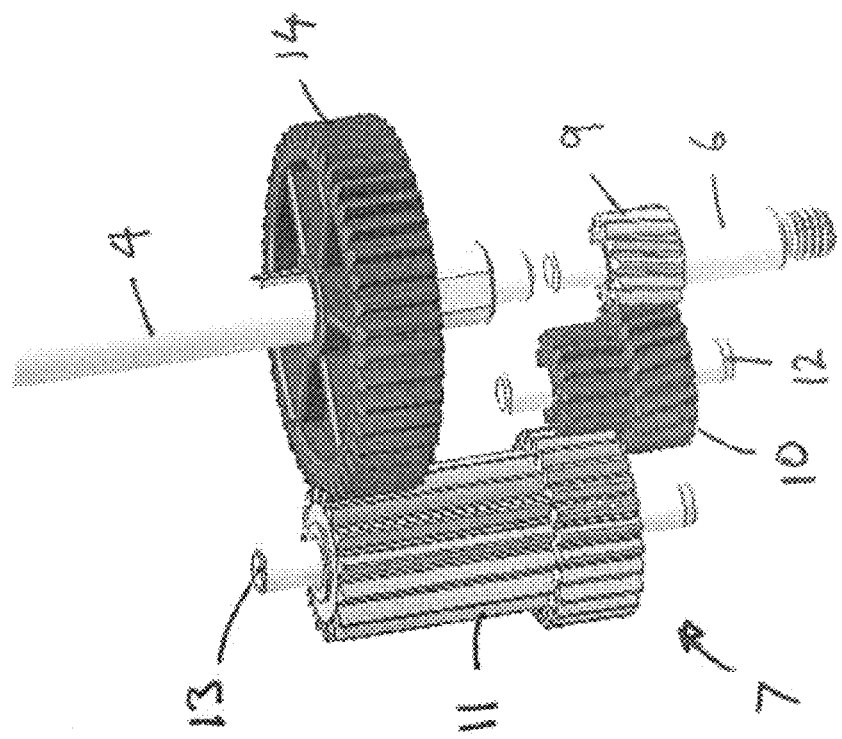
Figure 3

FOOD PROCESSOR

BACKGROUND TO THE INVENTION

1. Field of the Invention

The Invention relates to food processors and to safety interlocks and to blade safety stops for food processors.

2. Background Information

It is desired that when a lid or bowl of a food processor is opened during operation the blade should stop running within a very short period of time, say 1.5 seconds. Known food processors use a simply spring structure to stop the blade, but this does not work well when the blade is heavily loaded. One option is to stop the motor electronically, but this put stress on the motor shortening its life and requiring a heavier and more expensive motor.

SUMMARY OF THE INVENTION

A food processor or a chopper has a rotating blade, a motor, an intermediate shaft driven by the motor and an output shaft driving the blade. A first clutch member is coupled with the intermediate shaft, and a second clutch member is coupled with the output shaft. The first and second clutch members are movable from an engaged position for driving the output shaft from the motor and a disengaged position for disengaging the output shaft from the motor. A safety interlock mechanism enables and disables the motor in response to an operative condition of the food processor bowl. A clutch lever is operable with the safety interlock to move the first and second clutch members between the engaged and disengaged positions such that when the motor is enabled the first and second clutch members are engaged for driving the output shaft from the motor and when the motor is disabled the first and second clutch members are disengaged for disengaging the output shaft from the motor.

Preferably, the safety interlock mechanism comprises a plunger on the base and a switch for electrically enabling and disabling the motor, the clutch engageable by the plunger for moving the lever and engageable with one of the first or second clutch members and engageable with the switch.

Preferably, the clutch lever comprises a first portion coupled with the plunger and pivotably connected between its ends, a second portion coupled with the switch and pivotably connected between its ends, and a third portion connected between the first and second portions, the third portion engageable with one of the first or second clutch members.

Preferably, the first and second clutch portions engage by interference and not by friction.

Preferably, the food processor further comprises a motor pinion located on the intermediate shaft and a driving gear meshing with the motor pinion, and wherein the first clutch member comprises a clutch plate concentric with the output shaft and rotationally coupled with the output shaft, the second clutch member comprises a clutch gear concentric with the output shaft and meshing with the driven gear, one of the clutch plate or clutch gear having projections receivable within recesses in the other of the clutch plate or clutch gear for coupling the clutch plate and clutch gear.

Preferably, the food processor further comprises a thrust bearing coupled with the clutch lever and with the clutch plate for moving the clutch plate into engagement with the clutch bearing.

Preferably, the motor pinion, driven gear and clutch gear provide a reduction gear ratio between the motor and output shaft.

Preferably, the food processor further comprises a spring located between the clutch plate and clutch gear for biasing the clutch plate and clutch gear in the disengaged position.

Further aspects of the invention will become apparent from the following description.

BRIEF DESCRIPTION OF THE DRAWINGS

An exemplary form of the present invention will now be described by way of example only and with reference to the accompanying drawings, in which:

FIG. 3 is an exploded view of the clutch components, and

DESCRIPTION OF THE EXEMPLARY EMBODIMENTS

Figure 1:
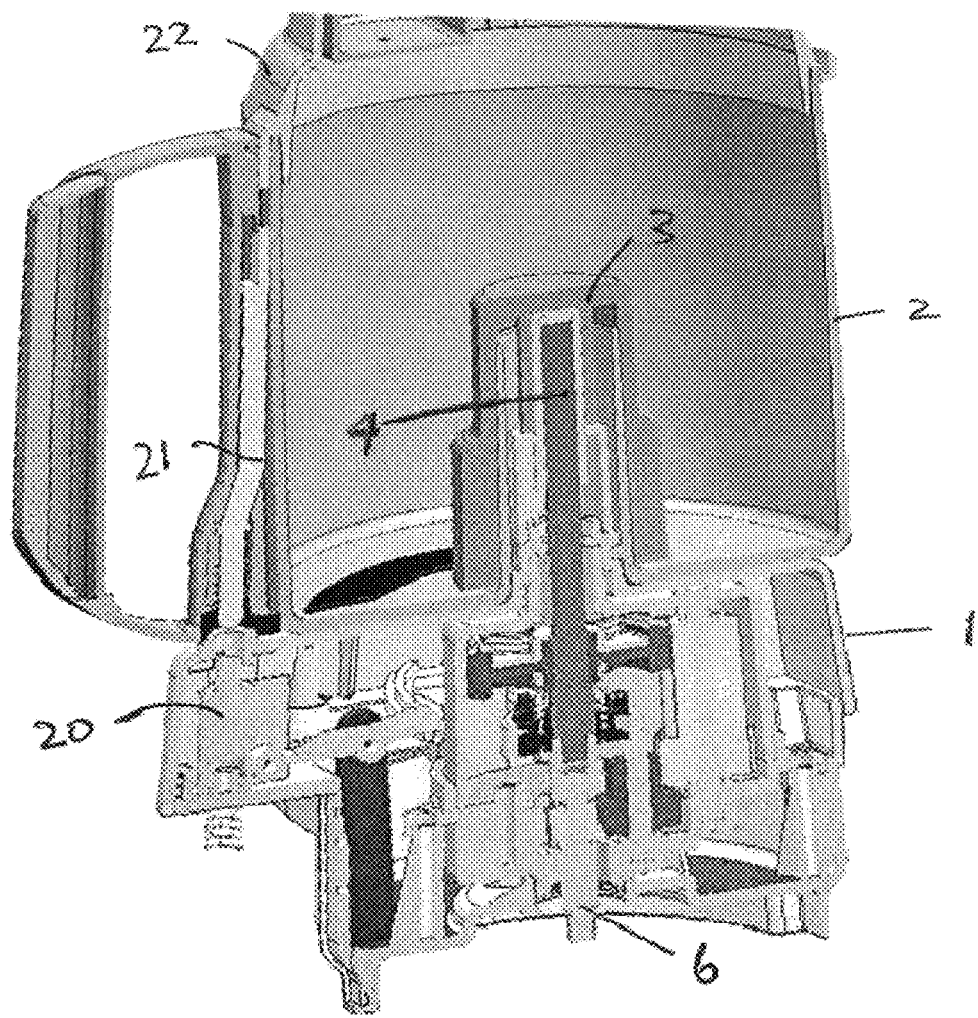
FIG. 1 is a section view of a food processor.
Figure 2:
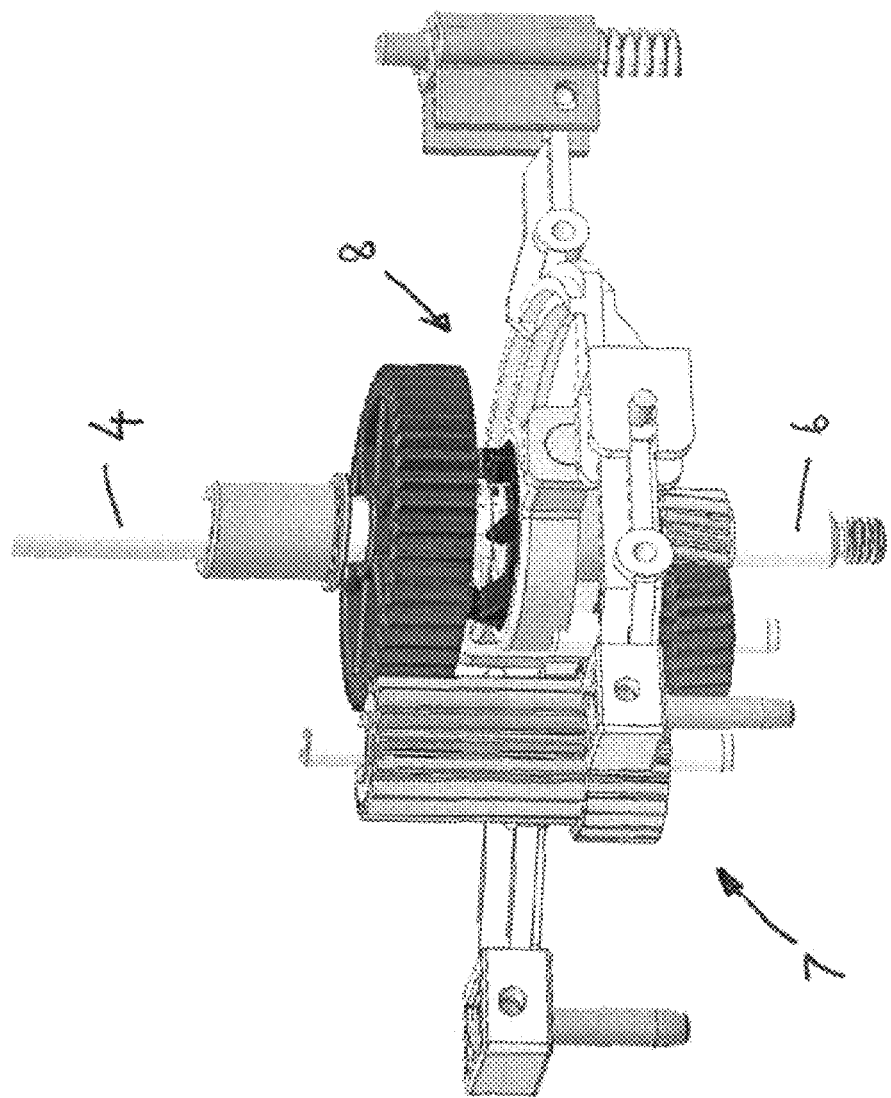
FIG. 2 is a view of a safely interlock and clutch of the food processor.
Figure 4:
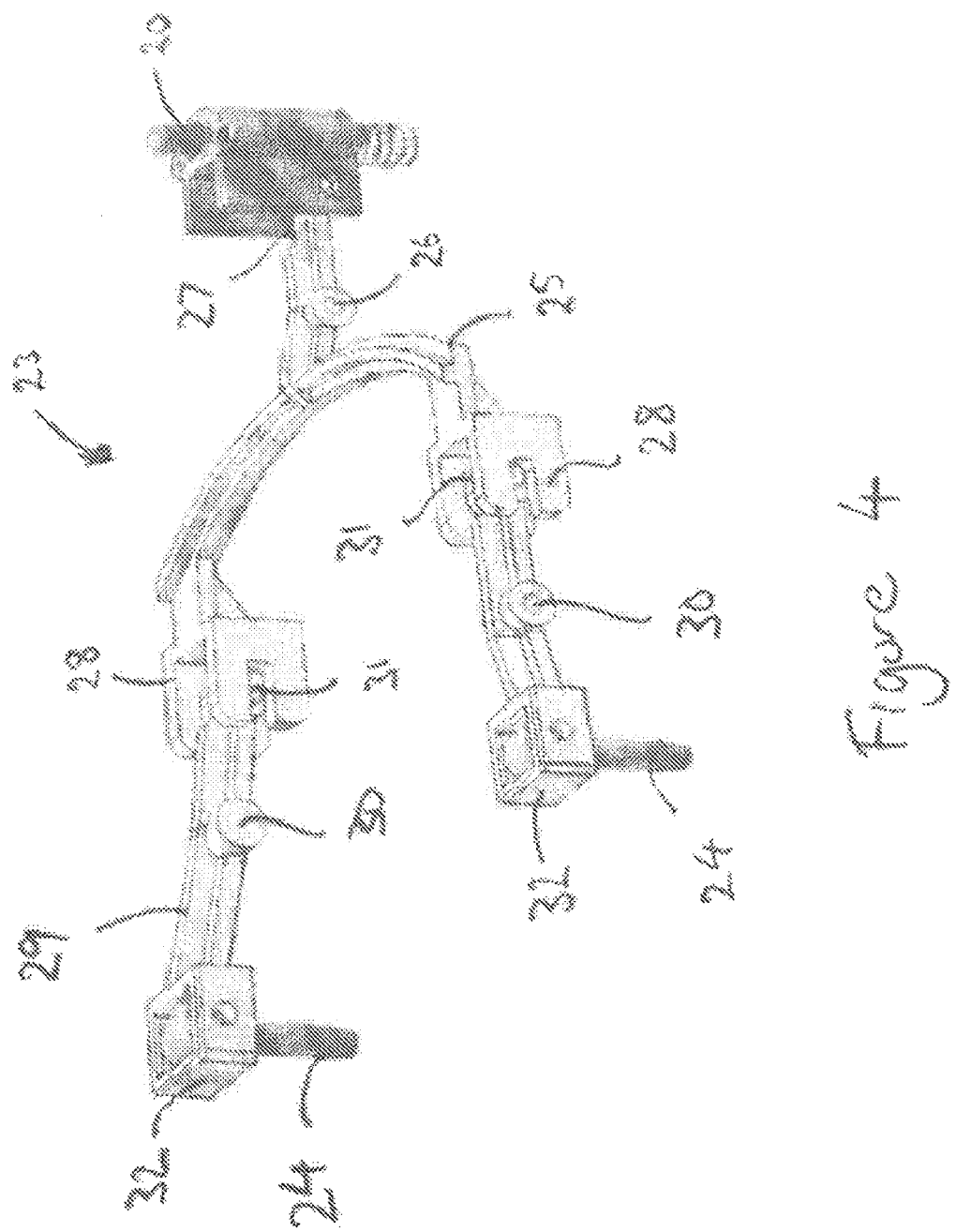
FIG. 4 is a view of the safely interlock and clutch lever.

Referring to the drawings there is shown a food processor according to the invention in which a clutch engages and disengages an output shaft driving a processing blade from the motor. The processor includes a base 1 adapted to receive a food processing bowl 2 on the base 1. An output shaft 4 of the processor drives a blade 3 located within the bowl 2 via complimentary couplings associated with the mating faces/surfaces of the base 1 and bowl 2. A motor is located in the base and drives an intermediate shaft 6, which is rotatable independently of the output shaft 4. In the drawings the intermediate shaft 6 and output shaft 4 are axially concentric although this is not critical to the invention. The output shaft is mounted for moth rotational movement and axial movement in the direction of arrow 17.

The output shaft 4 is driven from the intermediate shaft 6 by a gear train 7 and a clutch 8. The gear train 7 consists a motor pinion 9 rotationally coupled to the intermediate shaft 6, a set of intermediate gears 10 and a driven gear 11. The intermediate gears 10 and driven gear are rotationally mounted on respective spindles 12, 13 with the intermediate gears 10 meshing both the motor pinion 9 and driven gear 11 to driven the driven gear from the motor pinion 9. The clutch consists of a clutch gear located on and freely rotatably with respect to the output shaft 4 and a clutch plate 15. The clutch gear 14 is meshed with the driven gear 11 and when the motor operates the clutch gear 14 freely rotates on the output shaft 4 without rotating the output shaft 4. The clutch plate 15 is fixedly mounted to an end of the output shaft 4 and has a plurality of axially facing projections 16 about its periphery surrounding the output shaft 4. The output shaft 4 moves axially as indicated by arrow 17 such that the clutch plate 15 moves between an engaged position relative the clutch gear 14 wherein the projections 16 on the clutch plate 15 are received within corresponding recesses of the clutch gear 14, and a disengaged position for disengaging the projections 16 from within the corresponding recesses of the clutch gear 14. In the engaged position the clutch gear 14 and clutch plate 15 are rotational engaged and rotation of the clutch gear 14 rotates the clutch plate 15 and correspondingly the output shaft 4. A spring 34 is located between the clutch plate and clutch gear for biasing the clutch plate and clutch gear in the disengaged position. The clutch 8 is a type of clutch known as a dog clutch that engages by interference between the projections are recesses and not by friction, thus there is no slip in the clutch.

A safety interlock mechanism for enabling and disabling the motor in response to an operative condition of the food processor bowl is provided in known manner. The safety interlock mechanism consists of a plunger 20 on the base 1 and a switch for electrically enabling and disabling the motor. The plunger 20 is operated in known manner via a pusher 21 of the bowl 2 to operate the safety interlock when certain operating conditions of the bowl are met, such as the bowl being properly located on the base and the lid 22 in place on the bowl. When the operating conditions are met the motor can be operated. When the lid 22 or bowl 2 are not properly closed such as when the use removes the bowl 2 or bowl lid 22 the motor is disabled for safety reasons.

A clutch lever 23 is engageable by the plunger 20 and is operable with the safety interlock to move the clutch plate 15 between the engaged and disengaged positions and to operate the interlock switches via pins 24 at a distal end of the clutch lever 23. The clutch lever 23 consists of a first lever portion 25 coupled at its first proximal end 27 with the plunger 20 and with a second lever portion 29 at its distal end 28. The first lever portion is pivotally mounted at a pivot location 26 between its first and second ends 27, 28. The second lever portion 29 is coupled with the first lever portion 25 at its proximal end 31 and to pins 24 for activating interlock switches at its second end 32. The second lever portion is pivotally mounted at a second pivot location 30 between its first and second ends 31, 32. A thrust bearing 33 is located at the coupling ends 28, 31 between the first and second lever portions 25, 29. The thrust bearing supports the clutch plate 15 and moves the clutch plate 15 between the engaged and disengaged positions.

The clutch lever 23 is responsive to movement of the plunger to operate the interlock switches and the clutch 8 such that when the motor is enabled the clutch is engaged for driving the output shaft from the motor and when the motor is disabled the first and second clutch members are disengaged for disengaging the output shaft from the motor. In this way when the interlock is operated by, say, a user removing the lid 22 of the bowl 2 during use, the clutch disconnects the output shaft 4 from the motor allowing the blade to stop rotation much faster.

It should be appreciated that modifications and alternations obvious to those skilled in the art are not to be considered as beyond the scope of the present invention. Further, the invention could be a food processor or chopper generally having a rotating blade to be stopped quickly.

The invention claimed is:

1. A food processor having a rotating blade, the processor comprising:
   a base adapted to receive a food processing bowl,
   a motor located in the base,
   an intermediate shaft driven by the motor,
   an output shaft driving a blade coupling on the base,
   a first clutch member coupled with the intermediate shaft, and a second clutch member coupled with the output shaft, the first and second clutch members movable between an engaged position for driving the output shaft from the motor and a disengaged position for disengaging the output shaft from the motor,
   a safety interlock mechanism including a plunger on the base and a switch operating member for electrically enabling and disabling the motor in response to an operative condition of the food processing bowl, and
   a clutch lever coupled between the plunger and switch operating member and engageable between the plunger and switch operating member with one of the first or second clutch member, the clutch lever operable by movement of the plunger to move the switch operating member for electrically enabling and disabling the motor and to move the first and second clutch members between the engaged and disengaged positions such that when the motor is enabled the first and second clutch members are engaged which drives the output shaft from the motor and when the motor is disabled the first and second clutch members are disengaged which disengages the output shaft and the blade coupling from the motor.

2. The food processor of claim 1 wherein the clutch lever comprises a first lever portion having a proximal end and a distal end and a second lever portion having a first end and a second end, the first level portion coupled with the plunger at the proximal end and pivotably mounted between its ends, a second lever portion coupled with the switch operating member at the second end and pivotably mounted between its ends, the distal end of the first level portion coupled with the first end of the second lever portion and with one of the first or second clutch members.

3. The food processor of claim 1 wherein the first and second clutch members engage by interference and not by friction.

4. The food processor of claim 1 further comprising a motor pinion located on the intermediate shaft and a driven gear meshing with the motor pinion, and wherein the first clutch member comprises a clutch plate concentric with the output shaft and rotationally coupled with the output shaft, the second clutch member comprises a clutch gear concentric with the output shaft and meshing with the driven gear, and one of the clutch plate or clutch gear having projections receivable within recesses in the other of the clutch plate or clutch gear for coupling the clutch plate and clutch gear.

5. The food processor of claim 4 further comprising a thrust bearing coupled with the clutch lever and with the clutch plate for moving the clutch plate into engagement with the clutch gear.

6. The food processor of claim 4 wherein the motor pinion, driven gear and clutch gear provide a reduction gear ratio between the motor and output shaft.

7. The food processor of claim 4 further comprising a spring located between the clutch plate and clutch gear for biasing the clutch plate and clutch gear in the disengaged position.

8. The food processor of claim 1 further comprising a motor pinion located on the intermediate shaft and a driven gear meshed with the motor pinion, wherein the first clutch member comprises a clutch gear located about the output shaft and meshed with the driven gear, the clutch gear freely rotatable about the output shaft without rotating the output shaft, and wherein the second clutch member comprises a clutch plate fixedly mounted to the output shaft.

9. The food processor of claim 8 wherein the clutch gear has a plurality of axial engagement recesses and the clutch plate has a corresponding plurality of axial engagement projections that engage with the axial engagement recesses in the engaged position and are axially spaced from the axial engagement recesses in the disengaged position.

10. The food processor of claim 1 further including a thrust bearing coupling the output shaft with the clutch lever and wherein the output shaft moves axially by the clutch lever for engaging the second clutch member with the first clutch member.

11. The food processor of claim 1 wherein the disengaging the output shaft and the blade coupling from the motor results in the blade coupling stopping more quickly compared with the output shaft and blade coupling remaining engaged with the motor after disablement of the motor.

* * * * *